(12) United States Patent
Park

(10) Patent No.: US 8,765,247 B2
(45) Date of Patent: Jul. 1, 2014

(54) VACUUM INSULATION PANEL

(75) Inventor: Rae Jun Park, Gangwon-do (KR)

(73) Assignee: XL Co., Ltd., Wonju, Gangwon-do (KR)

( * ) Notice: Subject to any disclaimer, the term of this patent is extended or adjusted under 35 U.S.C. 154(b) by 95 days.

(21) Appl. No.: 13/193,916

(22) Filed: Jul. 29, 2011

(65) Prior Publication Data

US 2013/0029082 A1  Jan. 31, 2013

(30) Foreign Application Priority Data

Jul. 29, 2011 (KR) .................. 10-2010-0073704

(51) Int. Cl.
*F16L 59/065* (2006.01)
(52) U.S. Cl.
USPC .......................................................... 428/69

(58) Field of Classification Search
USPC ............................................................ 428/69
See application file for complete search history.

(56) References Cited

U.S. PATENT DOCUMENTS

| 5,091,233 A | * | 2/1992 | Kirby et al. ............... 428/69 |
| 5,157,893 A | * | 10/1992 | Benson et al. ............ 52/789.1 |
| 6,037,033 A | * | 3/2000 | Hunter ........................ 428/72 |

* cited by examiner

*Primary Examiner* — Alexander Thomas
(74) *Attorney, Agent, or Firm* — Edwards Wildman Palmer LLP; Kongsik Kim; Carolina E. Save

(57) ABSTRACT

The present invention relates to a vacuum insulation panel to be used as an insulation material, which panel has an improved structure to improve insulation properties over conventional vacuum insulation panels filed with fillers within outer plates. The present panel includes a spacer within vacuumed space, thereby supporting the structure of outer plate against atmospheric pressure and minimizing conductive thermal transfer.

4 Claims, 28 Drawing Sheets

VACUUM INSULATION PANEL

CROSS-REFERENCE TO RELATED APPLICATIONS

This application claims under 35 U.S.C. §119 (a) the benefit of Korean Application No. 10-2010-0073704 filed Jul. 29, 2010, the entire contents of which are incorporated herein by reference.

TECHNICAL FIELD

The present invention relates to a vacuum insulation panel to be used as an insulation material. More particularly, it relates to a vacuum insulation panel having an improved structure to improve insulation properties over conventional vacuum insulation panels filed with fillers within outer plates. The present panels include a spacer within a vacuumed space, thereby supporting the structure of the outer plates of the panels against atmospheric pressure and minimizing conductive thermal transfer. The present panels are provided with diffusion or non-diffusion getters disposed on the inner surface of the panel, thereby maintaining the gas pressure inside the panel to be $10^{-3}$ torr or lower.

BACKGROUND ART

Recognizing that minimizing cost in manufacturing environment-friendly products is important to improve the competitiveness, many companies and countries in the world make efforts to design buildings having high energy efficiency. Also, many companies and countries intensively compete each other to have priority in technologies to provide zero-energy buildings that do not depend on external energy. There are various certification systems to certify environment-friendly buildings and energy efficient buildings for buildings that meet certain requirements. In addition, the standard for insulation performance of windows and walls becomes hightened. Further, there are recent worldwide trends that collective energy consumption management systems are being effective and zero-energy buildings are being required. In view of these, it is widely recognized that environment-friendly green technology based business will produce high profit and developing and protecting related technologies is important.

It is known that a substantial amount (at least 50%) of energy can be saved by insulating the outer walls and windows of a building. Insulating outer walls and windows are thus regarded as one of the most important factors in saving energy of a building.

Conventionally, CFC, polyurethane foam, styro foam, glass wool, and the like were used as an insulation material in construction industry. Recently, vacuum insulation panel (VIP) and aerogel have been proposed. A vacuum insulation panel filled with glass wool was reported to show insulation performance at least 16 times higher than that of glass wool and at least 10 times higher than that of polyurethane foam or styro foam. Typically, a vacuum insulation panel includes a masking plate made of a metal or acid resistant plastic to maintain vacuum state inside the panel and a filler filled in the panel to maintain the shape of the panel. The fillers are made of organic or inorganic powders, fibers, or high molecular weight resins. These materials, however, have disadvantages that they may cause environmental harm after use and they may reduce insulation performance of the panels due to increased pressure by the gas produced by the materials.

Compared with conventional insulation panels, conventional vacuum insulation panels show higher insulation performance, fire resistancy, thermal resistancy, recyclability, and sound-proofing performance. The conventional vacuum insulation panels, however, are expensive, heavy, limited in size (30 cm×30 cm), and show low insulation performance at joints of panels.

Korean Patent No. 0253841 discloses an insulation jacket of a low-temperature device and a method of producing the same. Insulation materials such as glass wool, synthetic resin, polyurethane, organic polymers or multi-layers are filled in a vacuumed space inside the jacket and PdO is disposed in the vacuumed space to absorb hydrogen. Also, getter material is used to absorb gas effectively and zeolite is used to absorb water.

Korean Patent No. 0188443 discloses a vacuum insulation panel. A filler is filled in a vacuumed space and barium-lithium alloy, as a getter material, is inserted into the filler to adsorb gas. The patent describes that the gas pressure that the vacuum insulation panel can achieve is 0.1~10mmHg Korean Patent Application No. 10-1998-0710788 discloses a vacuum insulation container and a method of making the same. The vacuum insulation container includes a metal outer jacket having a vacuum discharge tube therein, a filler made of glass wool filled in the vacuumed space inside the jacket, and a getter system (SAES GETTERS, ST301) to absorb gas.

Korean Patent No. 0466614 discloses a method of preparing an open-cell hard polyurethane foam and a vacuum insulation panel using the same. According to the method, hard polyurethane foam, as a filler, is inserted into a metal laminate film Korean Patent No. 0540522 discloses a vacuum insulation panel and a device using the same.

Sheets each made of SiO2 as a main component and Al2O3, CaO, and MgO are stacked to form a filler. The filler is filled in an outer panel having gas masking capability. The outer panel is an aluminum-laminate film and filled with a filler and a gas adsorber is provide with the filler inside the panel.

Korean Patent Application No. 10-2004-7019549 discloses a vacuum insulation panel, a method of preparing same, and a refrigerator using the same. A filler made in the form of plate and with fiber is filled in an outer panel having gas masking capability. The panel is provided with, in addition to the filler, a physical adsorbing agent and chemical adsorbing agent to adsorb water and a chemical adsorber (non-vaporizable getters) to adsorb gas. The outer panel is a metal thin layer made of, e.g., stainless steel, aluminum, and iron, or is a plastic film laminate.

Korean Patent No. 0775716 discloses vacuum insulation material and a method of making the same. The vacuum insulation material is formed by a plurality of fillers having an octagonal shape and being made of glass fibers. The fillers are covered by an outer panel. The inner side of the panel is vacuum discharged. While decompressing the fillers, the outer panel is heat compressed, thereby thermally fusing the fillers and outer panel. As a result, the thermal fused portion is formed along the portion of the fillers.

Korean Patent Application No. 10-2006-0037124 discloses a vacuum insulation material and a method of preparing the same. A gas bather film having a layer of thermal fusion is used as an outer material. A filler is filled in the gas barrier film. Thereafter, a vacuum discharge is performed and the insulation material is sealed.

Korean Patent Application No. 10-2009-0076463 discloses a vacuum insulation material, an insulation box using the same, and a refrigerator using the same. A filler made of organic fibers is filled in an outer material having gas masking capability. A getter material to adsorb gas or steamed water is provide in the outer material. A filler made of polystyrene resin is proposed.

Korean Patent Application No. 10-2006-0037124 discloses a vacuum insulation material and a method of making the same. Gas barrier films are stacked and the edges of the films are folded in. Even when micropores and cracks are formed on the films, external gas cannot be introduced and the degree of vacuum is not lowered. The vacuum insulation material can be mounted to an object having a complicated shape.

Korean Patent No. 0753720 discloses a vacuum insulation material and a method of making the same. An outer material having gas masking capability is filled with a filler made of inorganic fiber polymers that do not contain binders.

Korean Patent No. 0781010 discloses a vacuum insulation material and a method of making the same. An outer film is filled with fiber glass and the inner side of the outer film is vacuum discharged. A portion that can be folded is provided, thereby allowing the film and the filler to be folded.

Korean Utility Model Registration Nos. 0414340 and 0415600 disclose a vacuum insulation panel that is formed by stacking a plurality of plates having continuous, consistent waves or embossed wrinkles with a flat panel. The edges thereof are stitched and finished with sealers, thereby forming vacuum spaces. A part of the stitched portion is finished with silicone and a needle is inserted into the silicone, thereby allowing the needle to act as a discharge tube.

The above-described prior art still has problems, however. The purpose of filling a filler in an insulating medium is to maintain the shape of an outer material and perform the insulation function.

The fillers can limit the insulation function.

The fillers reduce the degree of vacuum inside the outer material. Even when a filler having low thermal conductivity, the filler causes thermal transfer. It is known that when a filler is filled, the maximum degree of vacuum is ones or tens torr because low conductance of the filler and degasification occurred due to the filler at discharge. The above-described prior art merely describes that tens torr could be achieved or gas pressure could be lowered.

It is known that when the gas pressure is $10^{-2}$ torr, the theoretical maximum thermal conductivity is 0.002 W/mK. In reality, as the gas pressure is ones or tens torr, thermal transfer by convection and thermal transfer by conduction of fillers, the thermal conductivity may be much far higher than 0.002 W/mK.

FIG. 23 shows the relationship between thermal conductivity and gas pressure where an inorganic powder insulation filler is filled. The relationship shows that vacuum pressure should be maintained at $10^{-2}$ torr or lower to attain maximum insulation performance. Even though the relationship may vary slightly depending on the type/kind of the filler and compression density, it will be similar to that shown in FIG. 23. As shown in FIG. 23, in case where a filler is filled in an outer material, even if the vacuum pressure is maintained at $10^{-2}$ torr or lower, thermal transfer by conduction by the filler occurs, causing the thermal conductivity to be much higher than 0.002 W/mK. Accordingly, in case of using a filler, it is difficult to reduce the pressure that causes thermal loss due to convection and it is difficult to avoid thermal loss due to thermal conduction by the filler.

Thermal transfer in a vacuumed space from a heat source to ambient depends on the degree of vacuum. Although the thermal transfer may vary slightly depending on the shape of the heat source, the distance between the heat source and an object, and the shape of the object, it will be similar to that shown in FIG. 24. Thermal transfer occurs by radiation and convection by remaining gas. The main mechanism of thermal transfer with respect to vacuum regions I to III of FIG. 24 is as follows.

Vacuum region I: radiation and convection

Vacuum region II: convection (depending on degree of vacuum)

Vacuum region III: radiation

In case of a vacuum insulation panel in which a filler is filled in an outer panel, thermal transfer through the vacuum insulation panel occurs by radiation, convection by remaining gas, and conduction by the filler. The dependency of thermal transfer on degree of vacuum is shown in FIGS. 23 and 24. The main mechanism of thermal transfer with respect to vacuum regions I to III of FIG. 24 in case of the vacuum insulation panel in which a filler is filled in an outer panel is as follows.

Vacuum region I: Convection and conduction

Vacuum region II: Convection and conduction (thermal transfer by convection depends on degree of vacuum; compared with vacuumed space, as thermal transfer by convection occurs less, change of thermal transfer is not that high in this region)

Vacuum region III: Conduction

Some conventional vacuum insulation panels have non-diffusion getters to maintain vacuumed state and/or separate water adsorbing agent. In case of vacuum insulation panels using non-diffusion getters, cross sectional adsorption area is not enough and activation rate necessary for re-adsorption is low.

Some conventional vacuum insulation panels have an outer panel which is a plastic film or a thin plate made of stainless steel, aluminum, iron, etc. As a result, when a discharge process is performed after a filler is filled, the outer panel is compressed as the shape of the filler. Some other conventional vacuum insulation panels require separate compression process to bond an outer panel and a filler. In some conventional vacuum insulation panels, to hemetically seal the outer panel, sealers are used to bond the edges of the outer panel or the edges are folded and compressed. In case of sealers, degasification occurs due to the sealers, which in turn reduces the degree of vacuum. Further, when the panel is exposed to an external environment, the bonding force is reduced, which in turn reduces the degree of vacuum. In addition, in case of folding and compressing the edges, it is hard to attain sufficient degree of vacuum. It thus needs a method of bonding the edges of the outer panel to ensure hemetic sealing and maintain vacuum pressure of $10^{-3}$ torr or lower.

Some vacuum insulation panels include a filler inside an outer panel. Because of the filler filled in, it is difficult to reduce the pressure that causes thermal loss by convection and it is hard to avoid thermal loss by conduction by the filler itself.

The above information disclosed in the Background Art section is only for enhancement of understanding of the background of the invention and therefore it may contain information that does not form the prior art that is already known in this country to a person of ordinary skill in the art.

SUMMARY OF THE DISCLOSURE

One of the objectives of the present invention is to provide a vacuum insulation panel that shows improved insulation properties over the prior art vacuum insulation panels and are free of the disadvantages of the prior art vacuum insulation panels. Another objective is to provide a vacuum insulation panel that does not require a filler. Still another objective is to provide a vacuum insulation panel that can provide a structure of getters for improving vacuumed state. Still yet another objective is to provide a vacuum insulation panel in which a spacer is provided within outer upper and lower panels, diffusion or non-diffusion getters are disposed on all or part of the inner surface of the outer upper and lower panels or a sheet on which such getters are disposed is attached to the inner surface of the outer upper and lower panels, or such getters are disposed on a separate plate provided between the outer upper plate and outer lower plate. Yet another objective is to provide a vacuum insulation panel that can maintain vacuum pressure to be $10^{-3}$ torr or lower.

To achieve the objects, one aspect of the present invention provides a vacuum insulation panel comprising an outer upper plate, an outer lower plate bonded with the outer upper plate at the edges thereof, a vacuum space defined between the outer upper and lower plates, a spacer provided within the vacuum space for preventing deformation of the outer upper and lower plates by external force, and a getter portion disposed on the inner surface of the outer upper plate.

Another aspect of the present invention provides a vacuum insulation panel comprising an outer upper plate, an inner plate a side of which is bonded with the outer upper plate at the edges thereof, an upper vacuum space defined between the outer upper plate and the inner plate, an upper spacer provided within the upper vacuum space for preventing deformation of the outer upper plate by external force, an upper getter portion disposed on the inner surface of the outer upper plate, an outer lower plate being bonded to the other side of the inner plate at the edges thereof, a lower vacuum space defined between the outer lower plate and the inner plate, a lower spacer provided within the lower vacuum space for preventing deformation of the outer lower plate by external force, and a lower getter portion disposed on the inner surface of the outer lower plate.

The vacuum insulation panels according to the invention have thermal conductivity 10 times less that the prior art vacuum insulation panels filled with fillers therein, thereby being able to improve energy efficiency. In addition, they show excellent soundproofing characteristics. Also, they do not cause an environmental contamination while the prior art vacuum insulation panels filled with fillers therein do. Further, they show higher recycling efficiency than the prior art panels do. Moreover, they are applicable as many kinds of insulation materials in man fields (e.g., buildings, refrigerators, and cooling facilities).

The above and other features and advantages of the present invention will be apparent from or are set forth in more detail in the accompanying drawings, which are incorporated in and form a part of this specification, and the following Detailed Description, which together serve to explain by way of example the principles of the present invention.

DETAILED DESCRIPTION OF THE DISCLOSURE

Figure 1:
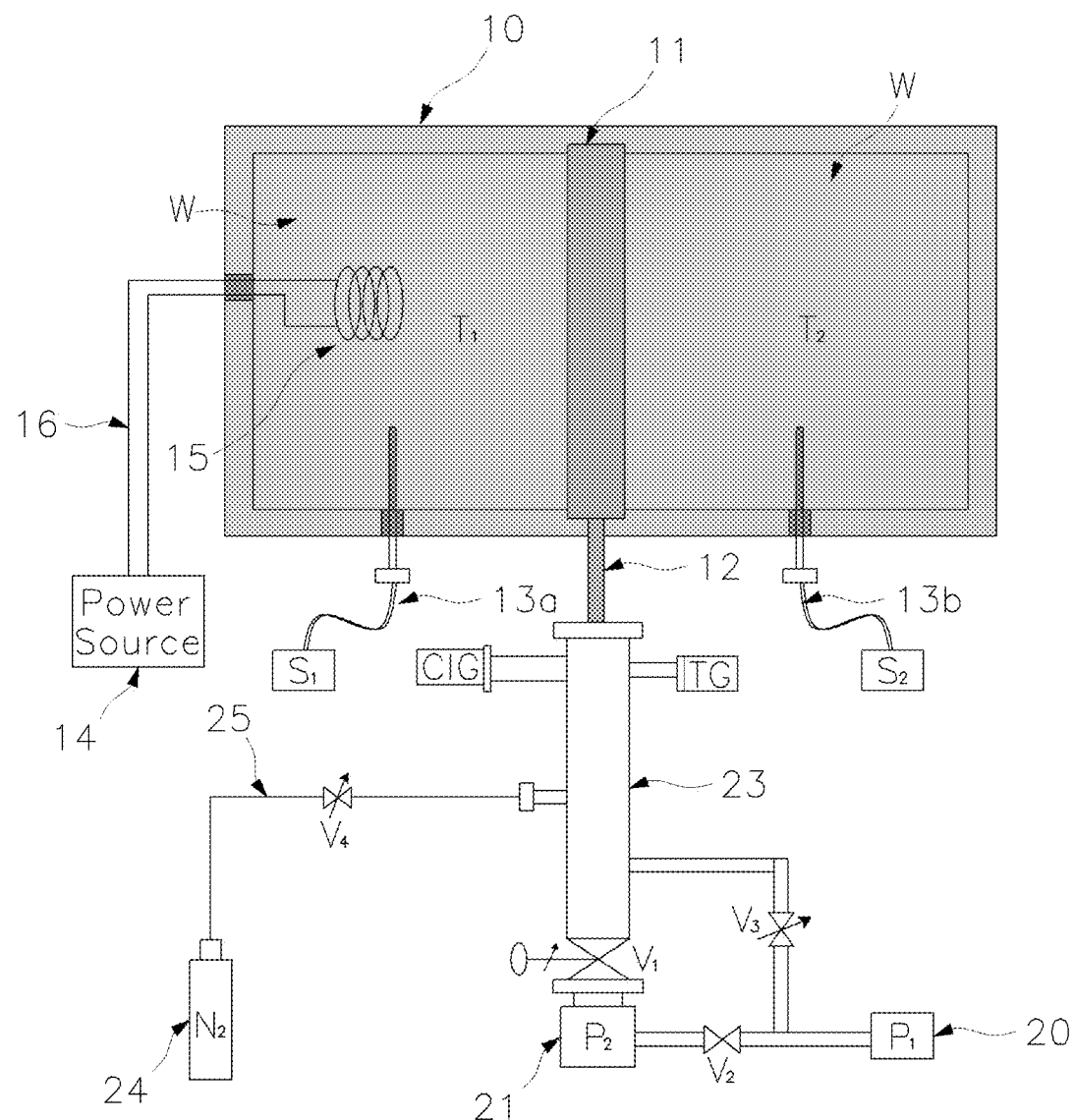
FIG. 1 shows a measuring device to be used to measure the thermal conductivity of vacuum insulation panels according the present invention.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

One aspect of the present invention provides a vacuum insulation panel comprising an outer upper plate (100) with a space defined therein, an outer lower plate (200) bonded with the outer upper plate (100) at the edges thereof, a vacuum space (600) defined between the outer upper plate (100) and the outer lower plate (200), a spacer (300) provided within the vacuum space (600) for preventing deformation of the outer upper plate (100) and the outer lower plate (200) by external force, and a getter portion (400) disposed on the inner surface of the outer upper plate (100).

The getter portion (400) may be formed by disposing getters on the inner surface of the outer upper plate (100). Alternatively, the getter portion (400) may be formed by disposing getters on one side of a sheet and attaching the other side of the sheet to the inner surface of the outer upper plate (100). The getter portion (400) can adsorb/absorb effectively gases that remain within the vacuum space (600) after degasification following filling is performed The getter portion (400) can be formed by disposing getters on all or part of the inner surface of the outer upper plate (100), or disposing getters on the outer upper plate (100) and the outer lower plate (200). The sheet on which getters are disposed can be attached the sheet to all or part of the outer upper plate (100) or all or part of the outer lower plate (200). Diffusion getters and non-diffusion getters can be used. Examples of the getters may include a Ba based alloy, Zr based alloy, a Ba—Li based alloy, a Zr—V—Fe based alloy, an alkali metal, an alkali earth metal, Ba, Mg, Ca, Sr, Ti, Zr, V, or an alloy thereof.

One side of the spacer (300) is in contact with the outer lower plate (200) and the other side of the spacer (300) is in contact with the outer upper plate (100) so as to support the outer upper plate (100) and the outer lower plate (200). The spacer (300) forms a vacuumed space(s) within the outer upper and lower plates to prevent deformation of the outer upper and lower plates. The spacer (300) can be realized by forming a flat plate in the form of zig-zag such that one side of the zig-zagged plate is in contact with the outer upper plate (100) and the other side thereof is in contact with the outer lower plate (200). The edges of the zig-zagged plate can be bonded with the edges of the outer upper and lower plates. The above-described structure of the spacer (300) provides an advantage that as the zig-zagged plate can be used as the spacer (300), the manufacturing process can be simplified without having to conduct separate processing steps. Alternatively, the spacer (300) can be realized by a plurality of spacers. One side of the each spacer is in contact with the outer upper plate (100) and the other side thereof is attached to the outer lower plate (200). The plurality of the spacers are disposed between the outer upper and lower plates, thereby preventing deformation of the outer upper and lower plates.

The outer upper plate (100) or the upper lower plate (200) can be, e.g., a flat plate, a wrinkled plate, a pulse-shaped plate, or a combination of a wrinkled plate and a pulse-shaped plate. The flat plate can be manufactured easily. The wrinkled plate, the uneven plate, or a combination thereof has a high mass moment of inertia, which can, in combination with the spacer (300), prevent deformation of the outer upper and lower plates.

In addition, the spacer (300) can be formed integrally with the outer lower plate (200). The spacer (300) can protrude from the outer lower plate (200) and be in contact with the outer upper plate (100), thereby supporting the outer upper and lower plates, in which case a separate spacer is not necessary. As discussed above, the outer upper plate (100) can be, e.g., a flat plate, a wrinkled plate, a pulse-shaped plate, or a combination of a wrinkled plate and a pulse-shaped plate.

Another aspect of the present invention provides a vacuum insulation panel comprising an outer upper plate (100) with a space defined therein, an inner plate (500) a side of which is bonded with the outer upper plate (100) at the edges thereof, an upper vacuum space (600*a*) defined between the outer upper plate (100) and the inner plate (500), an upper spacer (300*a*) provided within the upper vacuum space (600*a*) for preventing deformation of the outer upper plate (100) by external force, an upper getter portion (400*a*) disposed on the inner surface of the outer upper plate (100), an outer lower plate (200) with a space defined therein, the outer lower plate (200) being bonded to the other side of the inner plate (500) at the edges thereof, a lower vacuum space (600*b*) defined between the outer lower plate (200) and the inner plate (500), a lower spacer (300*b*) provided within the lower vacuum space (600*b*) for preventing deformation of the outer lower plate (200) by external force, and a lower getter portion (400*b*) disposed on the inner surface of the outer lower plate (200).

The upper and lower getter portions (400*a*, 400*b*) may be formed by disposing getters on the inner surfaces of the outer upper and lower plates (100, 200). Alternatively, the upper and lower getter portions (400*a*, 400*b*) may be formed by disposing getters on one side of a sheet and attaching the other side of the sheet to the inner surfaces of the outer upper and lower plates (100, 200). The upper and lower getter portions (400*a*, 400*b*) can adsorb/absorb effectively gases that remain within the upper and lower vacuum spaces (600*a*, 600*b*) after degasification following filling is performed The upper and lower getter portions (400*a*, 400*b*) can be formed by disposing getters on all or part of the inner surfaces of the outer upper and lower plates (100, 200), or disposing getters on all or part of the inner plate (500) as well as on the outer upper and lower plates (100, 200). The sheet on which getters are disposed can be attached the sheet to all or part of the outer upper and lower plates (100, 200) or all or part of the inner plate (500). Diffusion getters and non-diffusion getters can be used. Examples of the getters may include a Ba based alloy, Zr based alloy, a Ba—Li based alloy, a Zr—V—Fe based alloy, an alkali metal, an alkali earth metal, Ba, Mg, Ca, Sr, Ti, Zr, V, or an alloy thereof.

One side of the upper spacer (300*a*) is in contact with the upper surface of the inner plate (500) and the other side of the upper spacer (300*a*) is in contact with the outer upper plate (100) so as to support the outer upper plate (100). One side of the lower spacer (300*b*) is in contact with the lower surface of the inner plate (500) and the other side of the lower spacer (300*b*) is in contact with the outer lower plate (200) so as to support the outer lower plate (200). The upper and lower spacers (300*a*, 300*b*) form a vacuumed space(s) within the outer upper and lower plates to prevent deformation of the outer upper and lower plates. The upper spacer (300*a*) can be realized by forming a flat plate in the form of zig-zag such that one side of the zig-zagged plate is in contact with the (inner surface of) outer upper plate (100) and the other side thereof is in contact with the upper surface of the inner plate (500). The edges of the zig-zagged plate can be bonded with the edges of the outer upper plate (100) and the inner plate (500). The lower spacer (300*b*) can be realized by forming a flat plate in the form of zig-zag such that one side of the zig-zagged plate is in contact with (inner surface of) the outer lower plate (200) and the other side thereof is in contact with the lower surface of the inner plate (500). The edges of the zig-zagged plate can be bonded with the edges of the outer lower plate (200) and the inner plate (500). The above-described structure of the spacers (300*a*, 300*b*) provides an advantage that as the zig-zagged plate can be used as the spacers (300*a*, 300*b*), the manufacturing process can be simplified without having to conduct separate processing steps. Alternatively, the upper spacer (300*a*) can be realized by a plurality of spacers. One side of each of the plural spacers is in contact with the outer upper plate (100) and the other side thereof is attached to (the upper surface of) the inner plate (500). The lower spacer (300*b*) can be realized by a plurality of spacers. One side of each of the plural spacers is in contact with the outer lower plate (200) and the other side thereof is attached to (the lower surface of) the inner plate (500). The plurality of the spacers are disposed between the outer upper and lower plates, thereby preventing deformation of the outer upper and lower plates.

The outer upper plate (100) or the upper lower plate (200) can be, e.g., a flat plate, a wrinkled plate, a pulse-shaped plate, or a combination of a wrinkled plate and a pulse-shaped plate. The flat plate can be manufactured easily. The wrinkled plate, the uneven plate, or a combination thereof has a high mass moment of inertia, which can, in combination with the spacers (300*a*, 300*b*), prevent deformation of the outer upper and lower plates.

The vacuum insulation panels according to the invention have thermal conductivity 10 times less that the prior art vacuum insulation panels filled with fillers therein, thereby being able to improve energy efficiency. In addition, they show excellent soundproofing characteristics. Also, they do not cause an environmental contamination while the prior art vacuum insulation panels filled with fillers therein do. Further, they show higher recycling efficiency than the prior art panels do. Moreover, they are applicable as many kinds of insulation materials in man fields (e.g., buildings, refrigerators, and cooling facilities).

Figure 2:
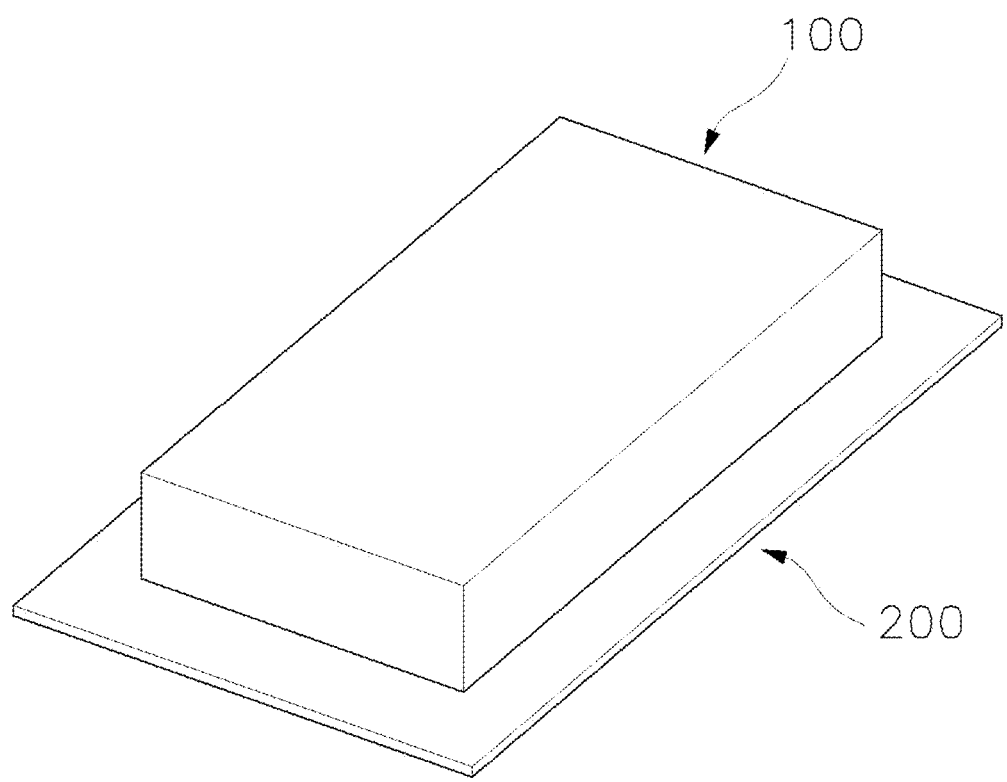
FIG. 2 is a perspective view of a vacuum insulation panel according to an embodiment of the present invention.
Figure 3:
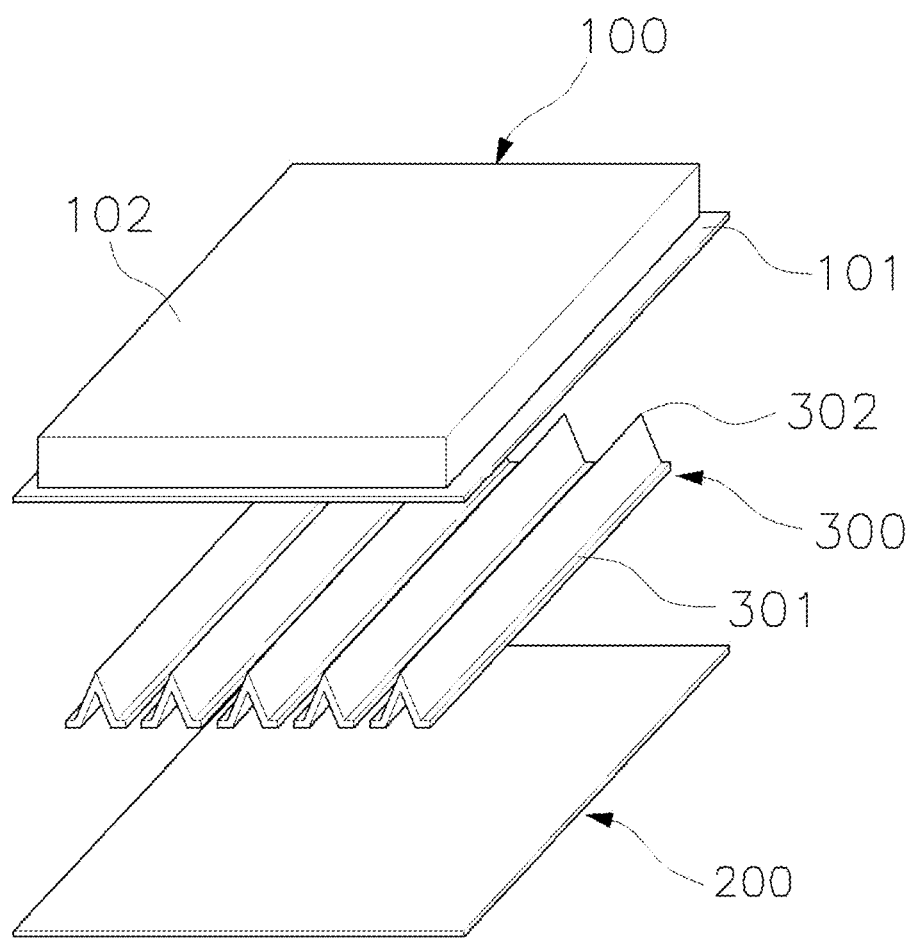
FIG. 3 is a disassembled perspective view of a vacuum insulation panel according to an embodiment of the present invention.
Figure 4:
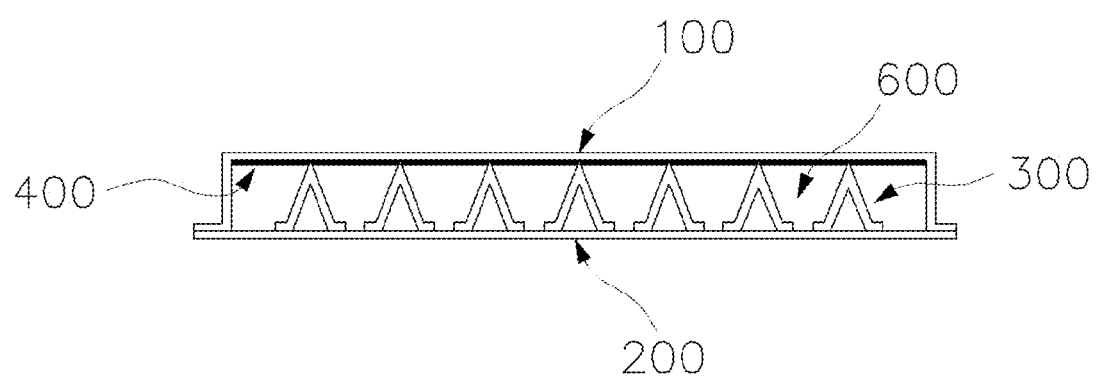
FIG. 4 is a cross-sectional view of a vacuum insulation panel according to an embodiment of the present invention.
Figure 20:
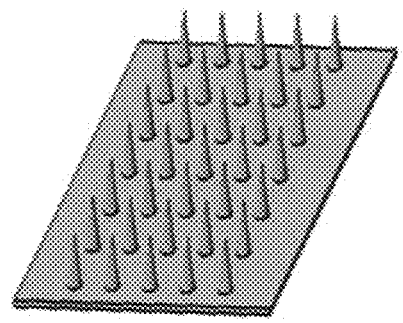
Figure 21:
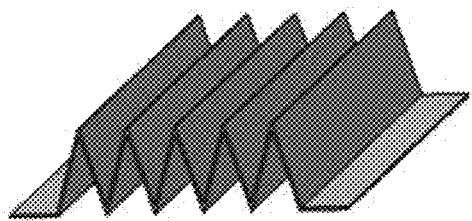
Figure 22:
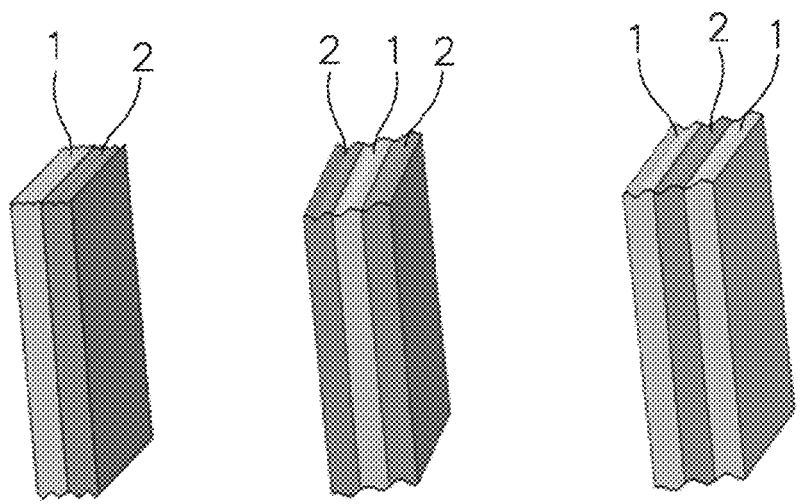
FIG. 22 shows a general insulation panel combined with a vacuum insulation panels according to an embodiment of the present invention.
Figure 23:
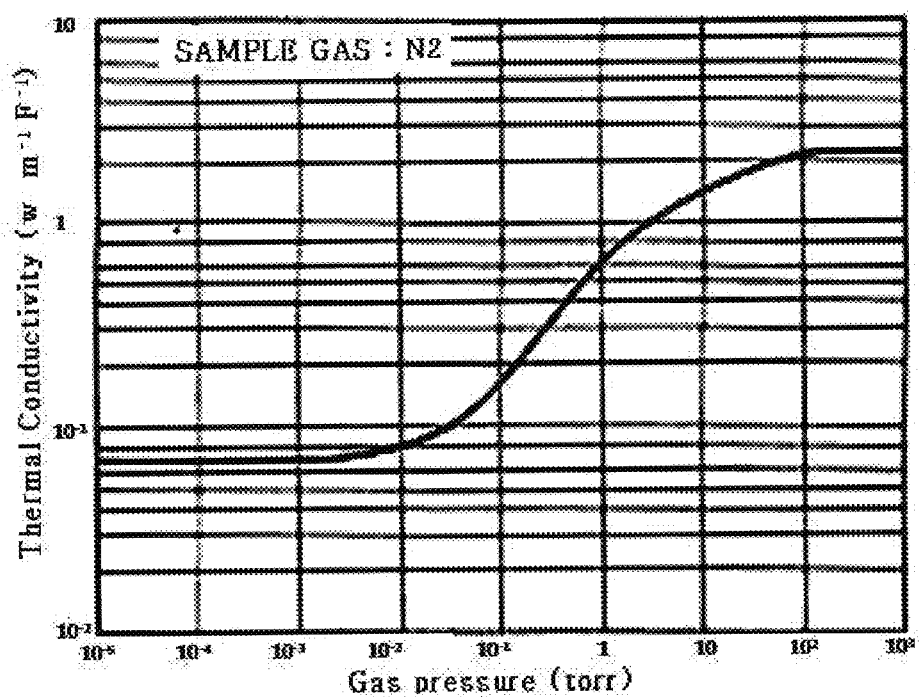
FIG. 23 is a graph showing relationship between thermal conductivity and gas pressure in which an inorganic powder insulating filler is filled (source: Glass Newspaper, 01/22/2009, units conversed).
Figure 24:
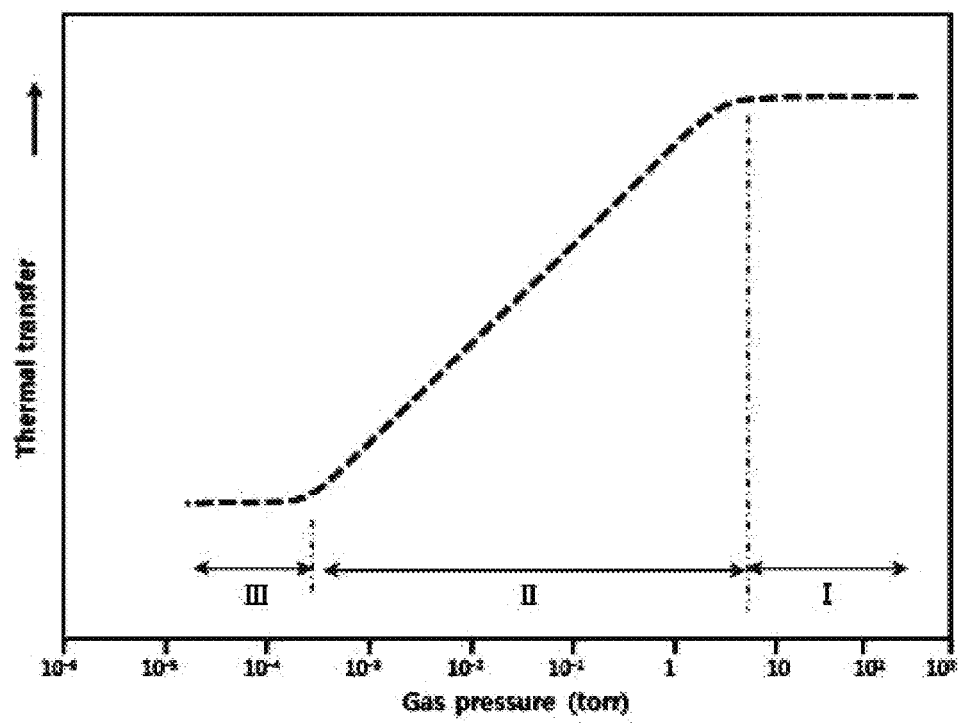
FIG. 24 is a graph showing the relationship between thermal conductivity and gas pressure in vacuum space (source: www.pfeiffer-vacuum.de).

Embodiments of the present invention will be described with reference to FIGS. 1-22 in more detail. FIG. 1 shows a measuring device to be used to measure the thermal conductivity of vacuum insulation panels according the present invention, FIG. 2 is a perspective view of a vacuum insulation panel according to an embodiment of the present invention, FIG. 3 is a disassembled perspective view of a vacuum insulation panel according to an embodiment of the present invention, FIG. 4 is a cross-sectional view of a vacuum insulation panel according to an embodiment of the present invention, FIGS. 5 to 14 show outer upper and lower panels of vacuum insulation panels according to embodiments of the present invention, FIG. 15 is a cross-sectional view of a vacuum insulation panel according to an embodiment of the present invention, in which an inner plate is contained, FIGS. 16 to 21 are perspective views of spacers of vacuum insulation panels according to embodiments of the present invention, and FIG. 22 shows a general insulation panel combined with a vacuum insulation panels according to an embodiment of the present invention.

A vacuum insulation panel according to an embodiment of the present invention is described in detail with reference to FIGS. 2-4. The vacuum insulation panel comprises an outer upper plate (100) with a space defined therein, an outer lower plate (200) bonded with the outer upper plate (100) at the edges thereof, a vacuum space (600) defined between the outer upper plate (100) and the outer lower plate (200), a spacer (300) provided within the vacuum space (600) for preventing the outer upper plate (100) and the outer lower plate (200) from being deformed by external force, and a getter portion (400) disposed on the inner surface of the outer upper plate (100).

The outer upper plate (100) has a space portion (102) defined therein such that the outer upper plate (100) and the outer lower plate (200) can form the vacuum space. The space portion (102), as shown in the figures, may be formed as a quadrilateral protruding from the outer upper plate. The edge (101) of the outer upper plate (100) is bonded with the edge (201) of the outer lower plate (200). The outer upper plate (100) and the upper lower plate (200) can be a plate made of, e.g., aluminum, stainless steel, carbon steel, Teflon, or plastic. It can also be a plate made of a high strength resin.

Figure 5:
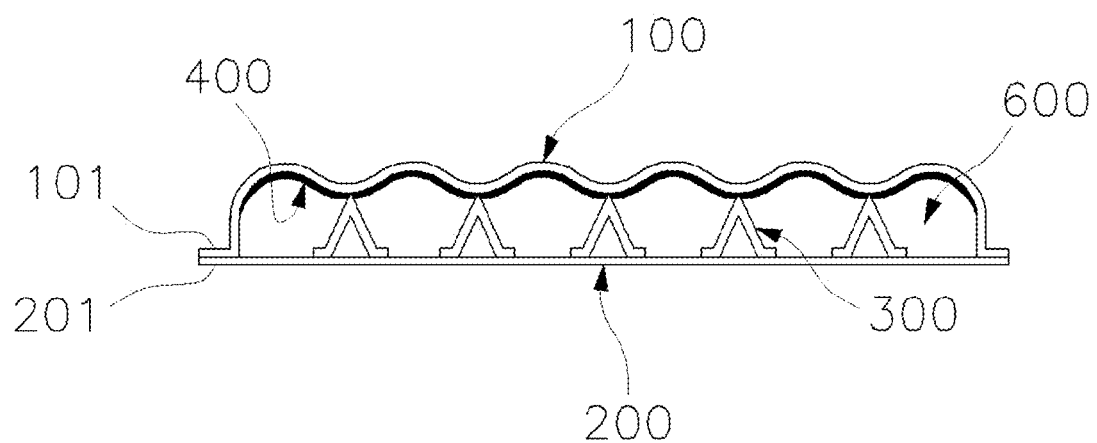
FIGS. 5 to 14 show outer upper and lower panels of vacuum insulation panels according to embodiments of the present invention.
Figure 6:
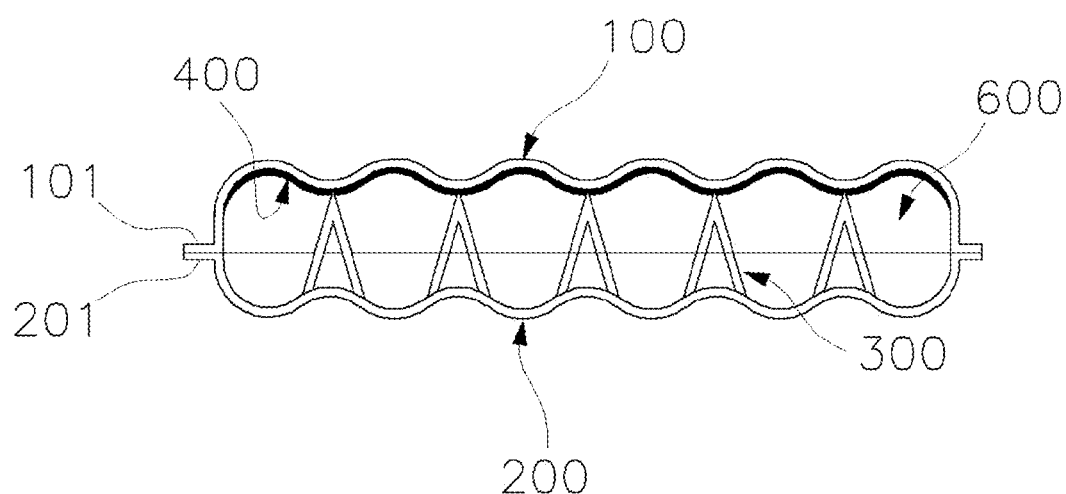
Figure 7:
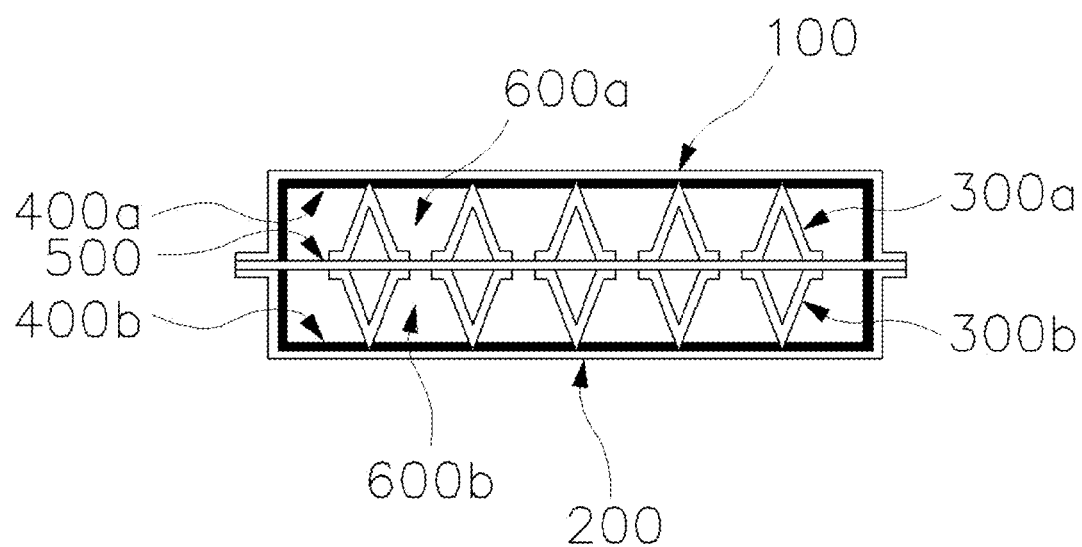
Figure 8:
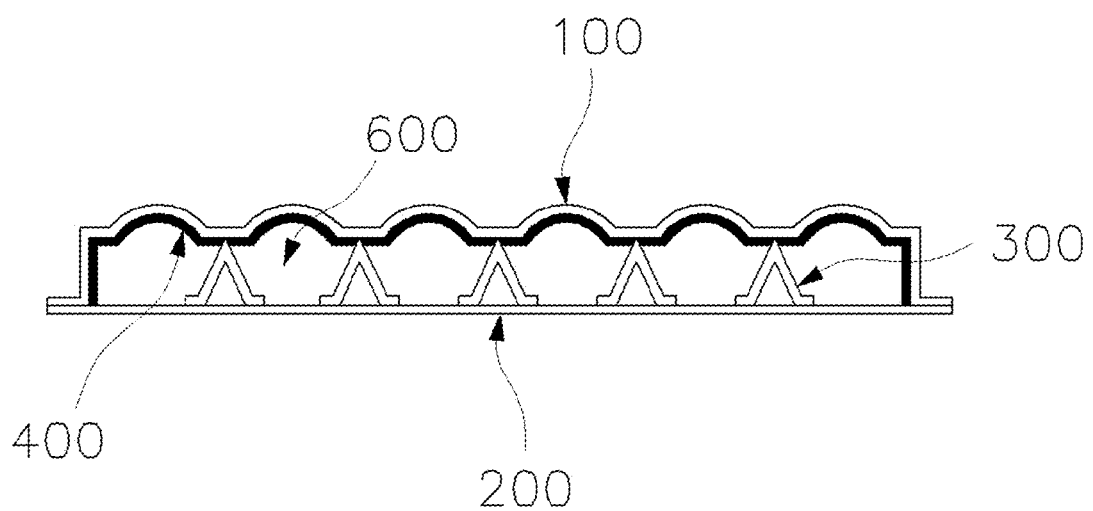
Figure 9:
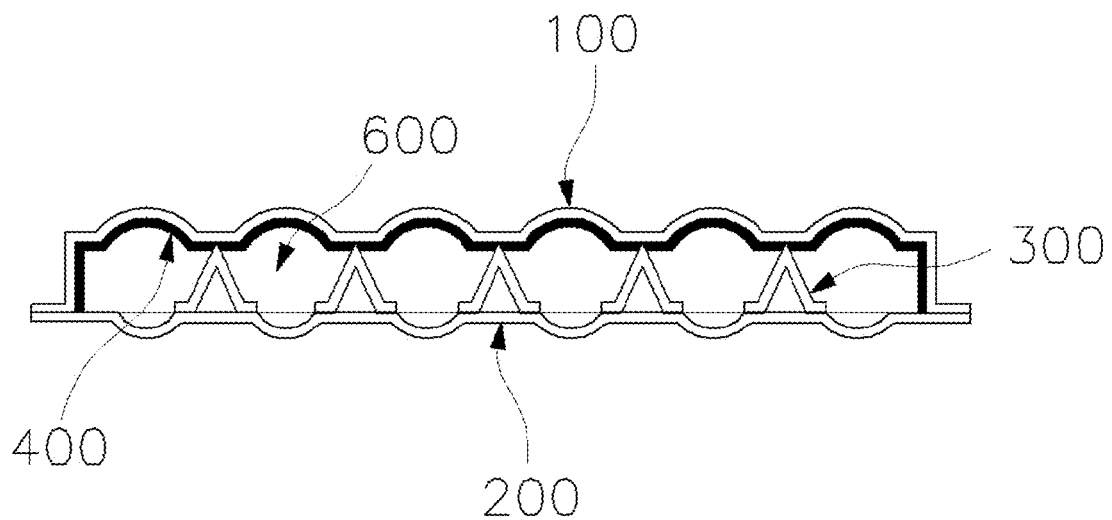
Figure 10:
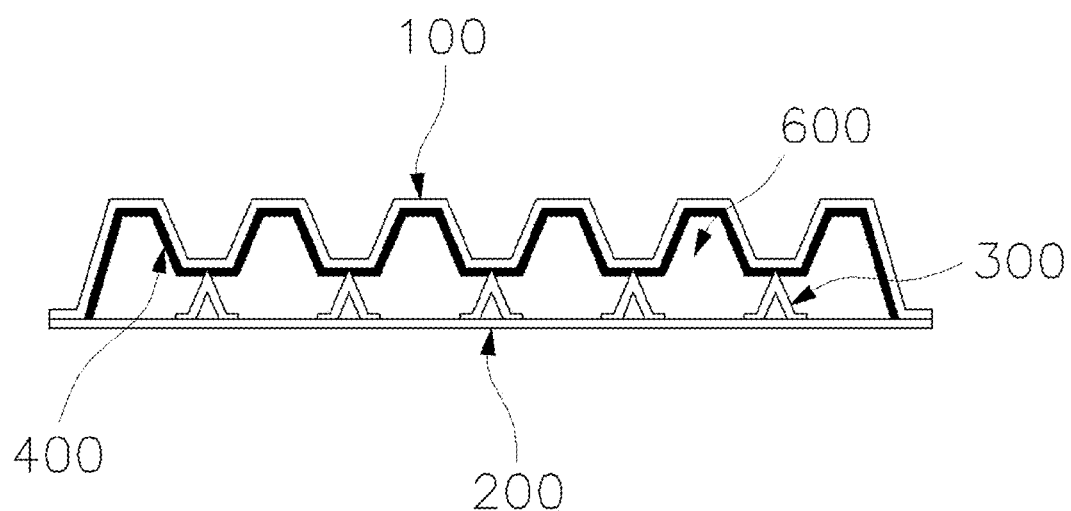
Figure 11:
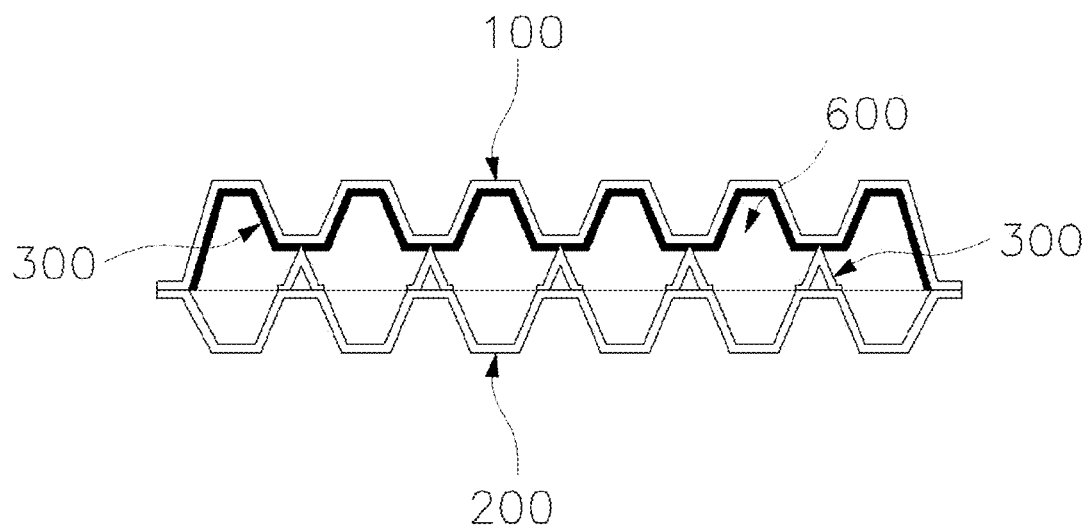
Figure 12:
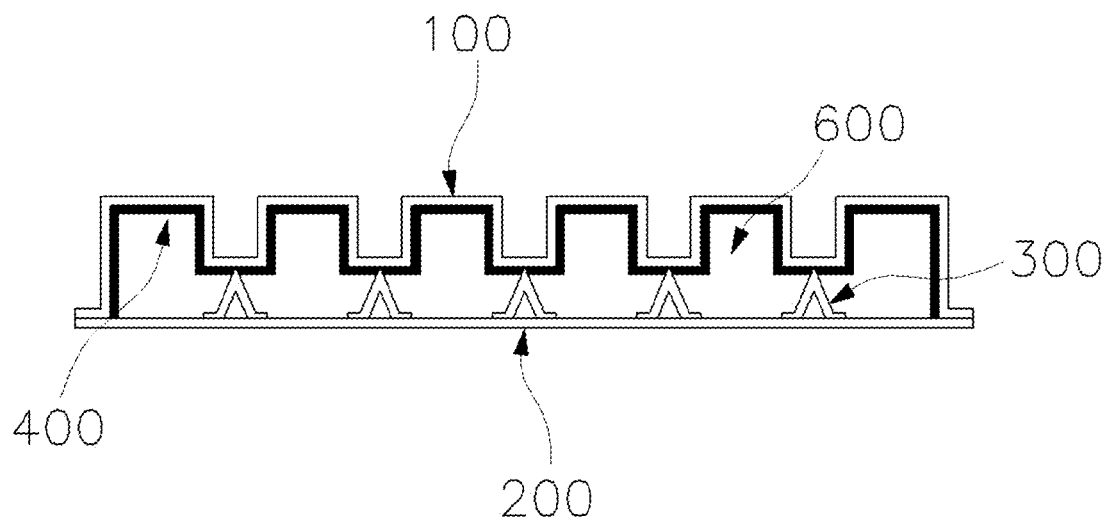
Figure 13:
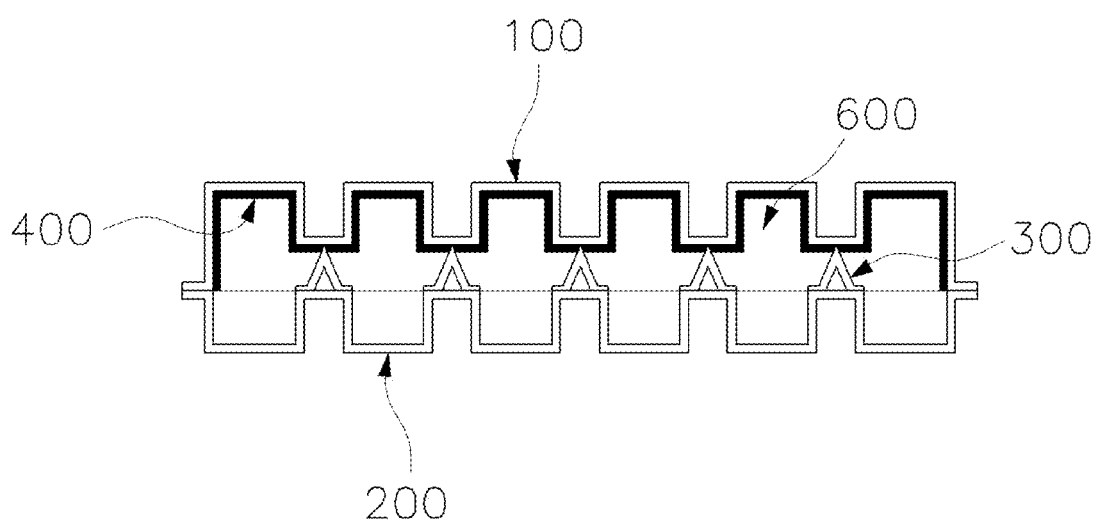
Figure 14:
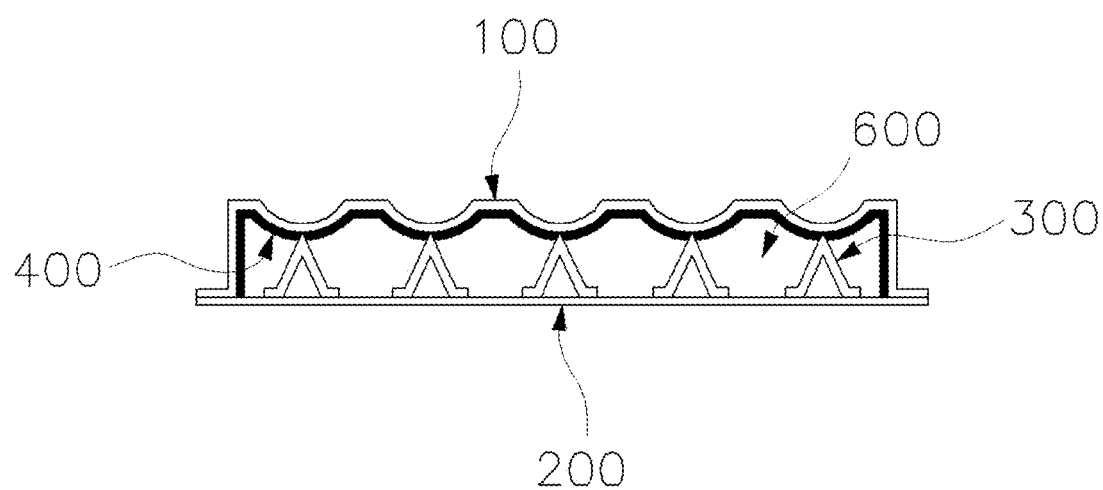
Figure 15:
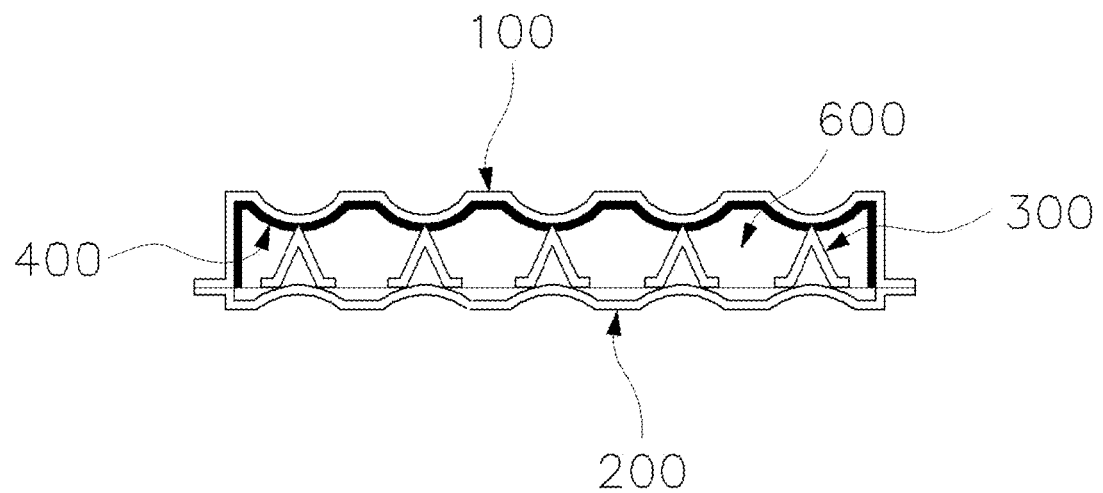
FIG. 15 is a cross-sectional view of a vacuum insulation panel according to an embodiment of the present invention, in which an inner plate is contained.

FIGS. 5 to 14 show outer upper and lower panels of vacuum insulation panels according to embodiments of the present invention. As shown in FIG. 5, the outer upper plate (100) can be a wrinkled plate in which the tops and bottoms are curved. As shown in FIG. 6, both the outer upper plate (100) and the outer lower plate (200) can be wrinkled plates. The wrinkled plate(s) has a high mass moment of inertia, which can help prevent deformation of the outer upper and/or lower plates. As shown in FIGS. 7 and 8, the outer upper plate (100) and/or the outer lower plate (200) can be a combination of a wrinkled plate and a pulse-shaped plate in which the bottoms are formed to be flat. As shown in FIGS. 9 to 12, the outer upper plate (100) and/or the outer lower plate (200) can be a pulse-shaped plate(s) in which the tops and bottoms are flat. As shown in FIGS. 13 and 14, the outer upper plate (100) and/or the outer lower plate (200) can be a combination of a wrinkled plate and a pulse-shaped plate in which the tops are flat and the bottoms are curved. The spacer (300) can be disposed so as to be in contact with the bottoms of the outer upper plate (100).

As discussed above, the vacuum space (600) is defined by a space between the outer upper plate (100) and the outer lower plate (200). The vacuum pressure of the vacuum space is maintained at $10^{-3}$ torr or lower. To maintain the vacuum pressure at $10^{-3}$ torr or lower, the getter portion (400) is disposed at all or part of the inner surface of the outer upper plate (100).

The getter portion (400) can be formed by disposing getters on all or part of the inner surface of the outer upper plate (100) and/or disposing getters on the outer upper plate (100) and the outer lower plate (200). Alternatively, the getter portion (400) may be formed by disposing getters on one side of a sheet and attaching the other side of the sheet to the inner surface of the outer upper plate (100) and/or the outer lower plate (200). The getter portion (400) can adsorb/absorb effectively gases that remain within the vacuum space (600) after degasification following filling is performed Diffusion getters and non-diffusion getters can be used. Examples of the getters may include a Ba based alloy, Zr based alloy, a Ba—Li based alloy, a Zr—V—Fe based alloy, an alkali metal, an alkali earth metal, Ba, Mg, Ca, Sr, Ti, Zr, V, or an alloy thereof.

The spacer (300) is disposed between the outer upper plate (100) and the outer lower plate (200) to prevent the outer upper plate (100) and the outer lower plate (200) from being deformed by external force (e.g., atmospheric pressure). The spacer (300) can be realized by forming a flat plate into a zig-zagged form. In this case, the edge of the spacer (300) is bonded with the edges of the outer upper and lower plates (100, 200). In case where the spacer (300) is a zig-zagged plate, the manufacturing process can be simplified. Alternatively, the spacer (300) can be realized by a plurality of spacers. One side of the spacer (300) is in contact with (and, in some cases, attached to) the outer lower plate (200) and the other side of the spacer (300) is in contact with (and, in some cases, attached to) the outer upper plate (100) so as to support the outer upper plate (100) and the outer lower plate (200).

Figure 16A:
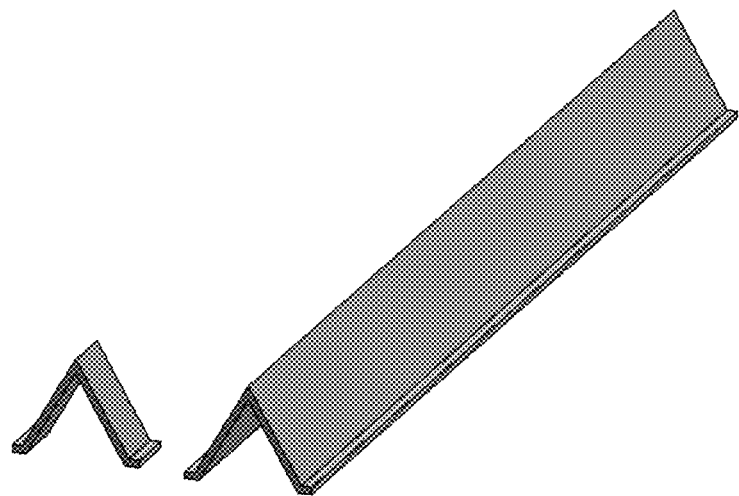
FIGS. 16 to 21 are perspective views of spacers of vacuum insulation panels according to embodiments of the present invention.
Figure 16B:
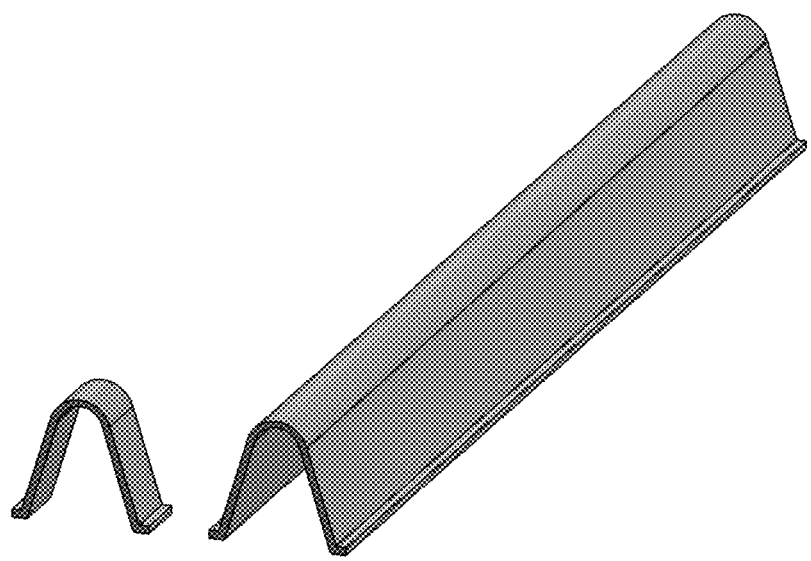
Figure 16C:
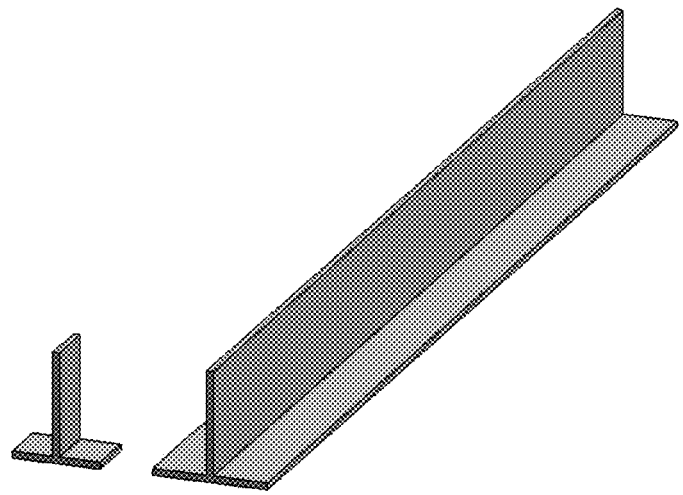
Figure 16D:
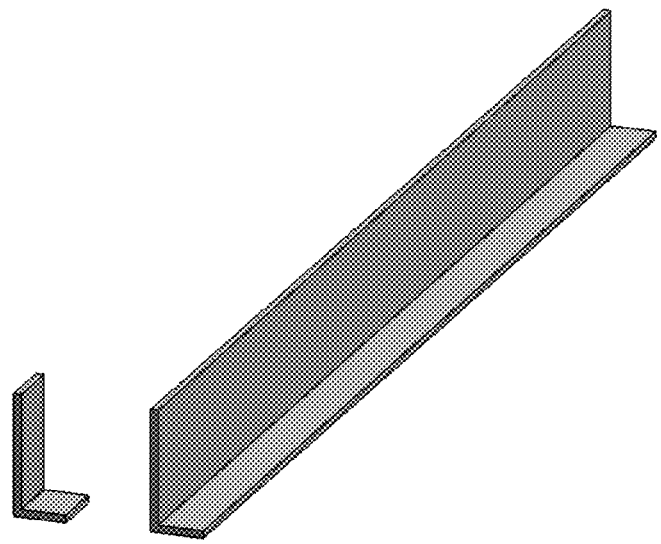
Figure 17A:
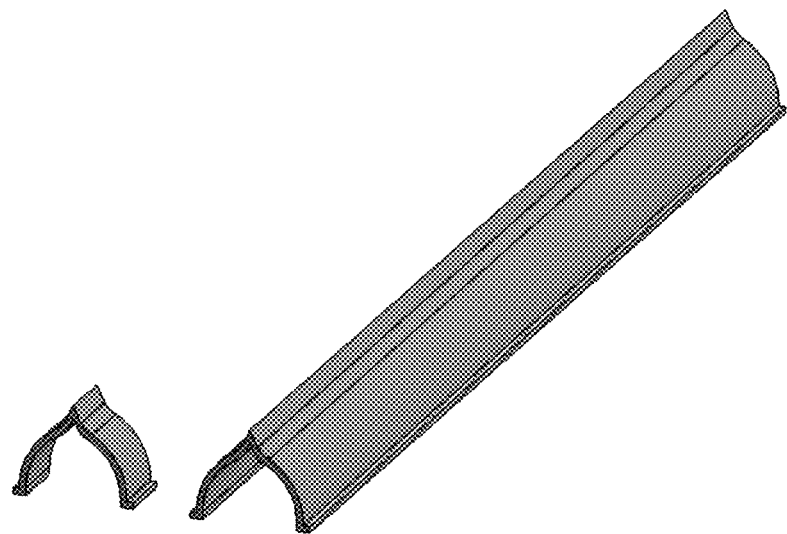
Figure 17B:
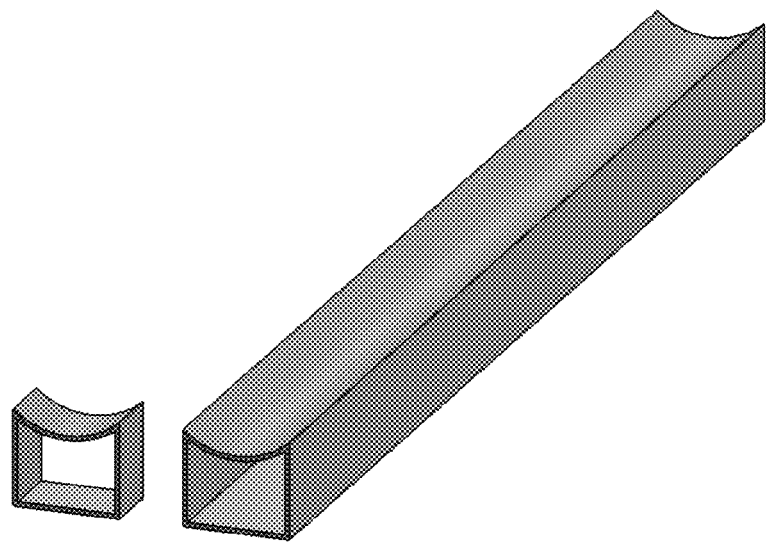
Figure 17C:
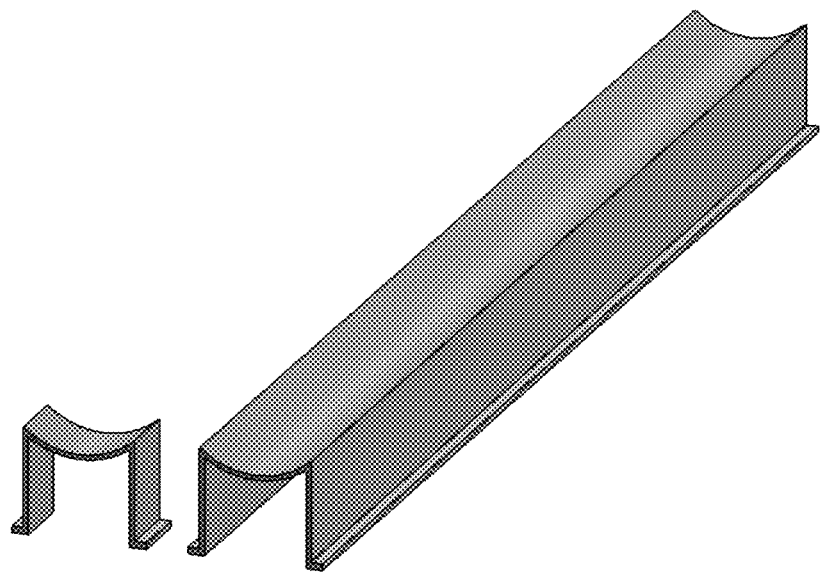
Figure 17D:
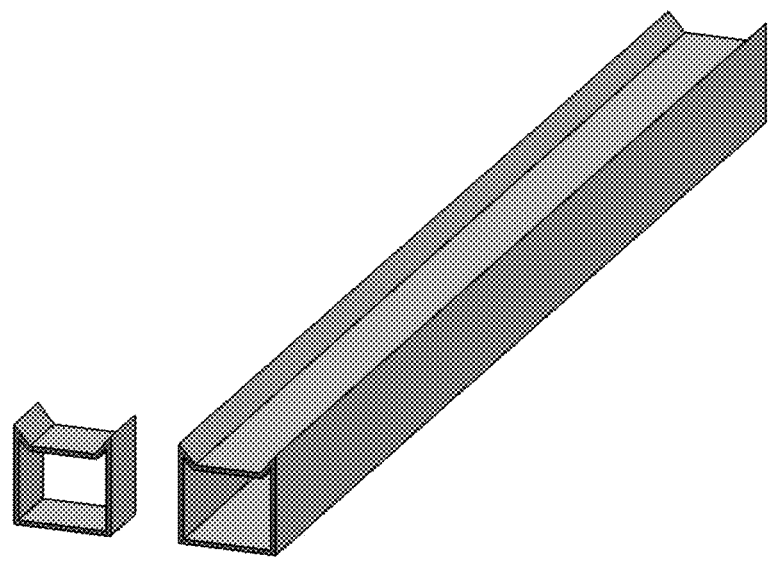
Figure 18A:
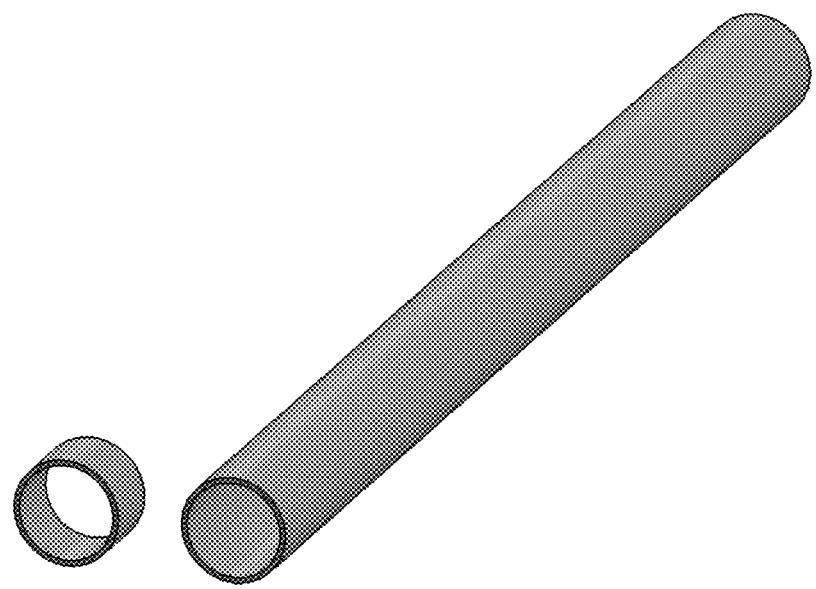
Figure 18B:
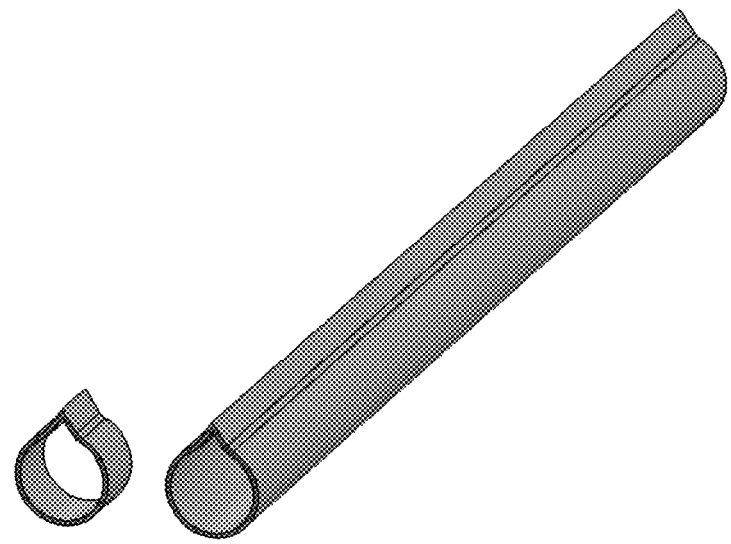
Figure 18C:
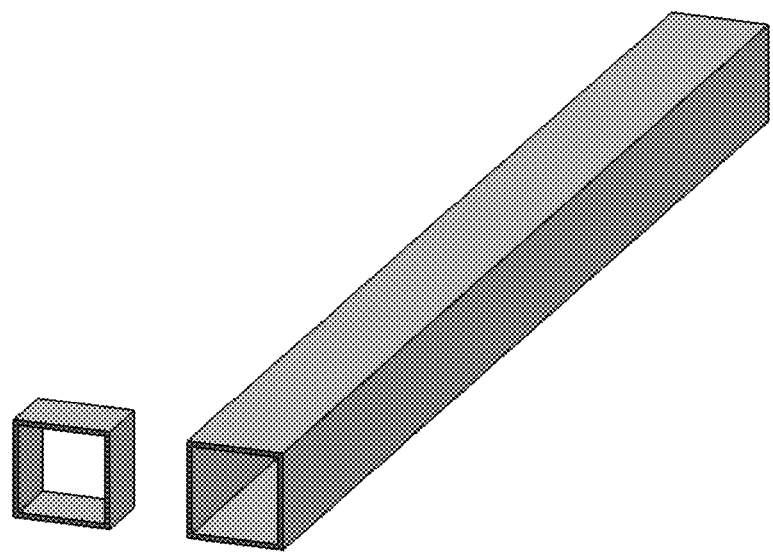
Figure 18D:
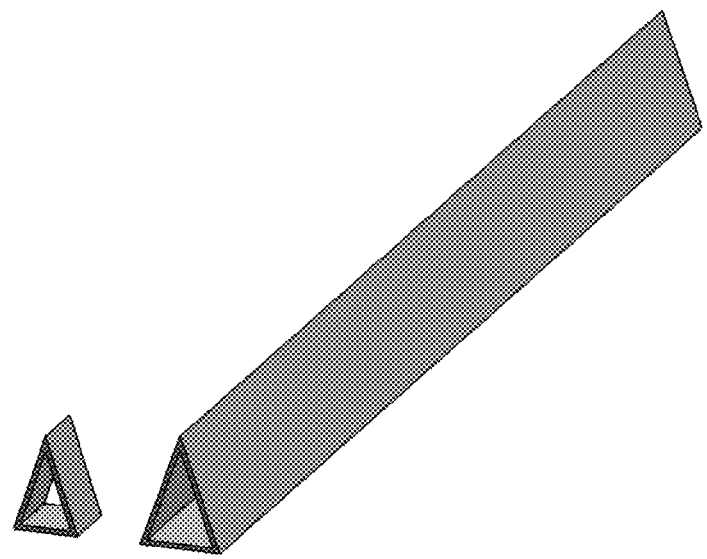
Figure 19A:
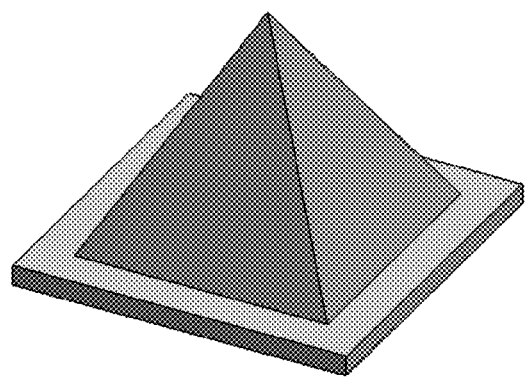
Figure 19B:
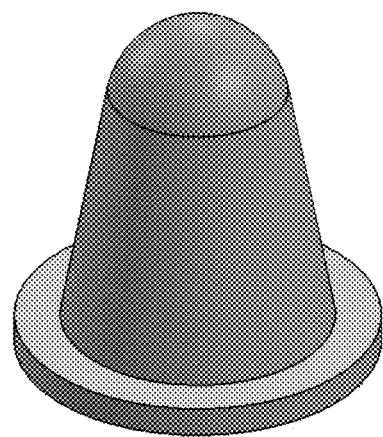
Figure 19C:
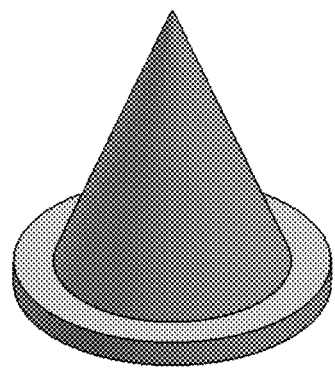

The shape of the spacer (300) can be formed in various ways, examples of which are described with reference to FIGS. 16 to 21. As shown in FIGS. 16(a) and 16(b), the cross-section of the spacer (300) can be a triangle or a curved triangle in which the bottom is open. As shown in FIGS. 16(c) and (d), the cross-section of the spacer (300) can be T or L. As shown in FIG. 17(a), the spacer (300) can be formed such that the top portion is sharp and the side portion is curved. As shown in FIG. 17(b), the spacer (300) can be formed such that the cross-section is a quadrilateral and the top side of the quadrilateral is curved. As shown in FIG. 17(c), the spacer (300) can be formed such that the cross-section is a quadrilateral and the top side of the quadrilateral is curved and the bottom side thereof is open. As shown in FIG. 17(d), the spacer (300) can be formed such that the cross-section is a quadrilateral and the top side of the quadrilateral has protruding portions. As shown in FIGS. 18(a) to 18(d), the cross-section of the spacer (300) can be a circle, a circle having a protruding portion, a quadrilateral, or a triangle. As shown in FIGS. 19(a) to 19(c), the spacer (300) can has a cone shape. As shown in FIG. 20, a plurality of cone-shaped spacers can be formed integrally with the outer lower plate (200). As shown in FIG. 21, the spacer (300) can be a zig-zagged plate. Preferably, the bottom portion(s) of the spacer (300) can be in contact with and attached to the outer lower plate (200) and the top portion(s) of the spacer (300) can be in contact with the outer upper plate (100). The length of the spacer (300) can be designed to be short or long.

A vacuum insulation panel including an inner plate according to an embodiment of the present invention is described with reference to FIG. 15. The vacuum insulation panel comprises an outer upper plate (100) with a space defined therein, an inner plate (500) a side of which is bonded with the outer upper plate (100) at the edges thereof, an upper vacuum space (600a) defined between the outer upper plate (100) and the inner plate (500), an upper spacer (300a) provided within the vacuum space (600a) for preventing deformation of the outer upper plate (100) by external force, an upper getter portion (400a) disposed on the inner surface of the outer upper plate (100), an outer lower plate (200) with a space defined therein, the outer lower plate (200) being bonded to the other side of the inner plate (500) at the edges thereof, a lower vacuum space (600b) defined between the outer lower plate (200) and the inner plate (500), a lower spacer (300b) provided within the vacuum space (600b) for preventing deformation of the outer lower plate (200) by external force, and a lower getter portion (400b) disposed on the inner surface of the outer lower plate (200). The outer upper and lower plates (100, 200) of this vacuum insulation panel can be made of the same materials as described above. Also, the outer upper and lower plates (100, 200) can have the same shapes as described in FIGS. 5 to 14.

The inner panel (500) is positioned between the outer upper plate (100) and the outer lower plate (200). The space defined by the outer upper plate (100) and the inner plate (500) forms the upper vacuum space (600a) and the space defined by the outer lower plate (200) and the inner plate (500) forms the lower vacuum space (600b). The vacuum pressure of the vacuum spaces is maintained at $10^{-3}$ torr or lower for insulation. To maintain the vacuum pressure at $10^{-3}$ torr or lower, the getter portion (400) is provided.

FIG. 22 shows a general insulation panel(s) combined with a vacuum insulation panel(s) according to an embodiment of the present invention. The vacuum insulation panels according to the present invention can be applied to man fields (e.g., buildings, refrigerators, and cooling facilities).

EXAMPLES

The following examples illustrate the invention and are not intended to limit the same.

To assess the insulation characteristics of the vacuum insulation panels according to the present invention, thermal conductivity with respect to the degree of vacuum was measured using the device shown in FIG. 1. A vacuum insulation panel according to the present invention was prepared. For comparison, an insulation panel filled with glass wools and an insulation panel having a thick stainless steel plates between which no filler is filled were prepared.

1. Comparison of Thermal Conductivity

1) Device (FIG. 1)

A insulation box (10) includes a high temperature section (H) and a low temperature section (C). The temperature of the high temperature section (H) can be changed by using a heater and maintained at a certain temperature. The temperature (T1) of the high temperature section (H) and the temperature (T2) of the low temperature section (C) are measured by a temperature sensor 1 (S1) and a temperature sensor 2 (S2). The high and low temperature sections are filled with water (W). The weight of the filled water (W) is maintained at a certain value. The cross-sectional area of the insulation panel (sample) (11) is maintained at a certain value (e.g., 300 mm×300 mm) The thickness of the insulation panel (sample) (11) is maintained as a certain value (e.g., 10 mm) A vacuum system and a nitrogen purge line are provided for changing the degree of vacuum and maintaining the degree of vacuum constantly for the insulation panel (sample) (11). A vacuum discharge tube is penetrated into and bonded with a side of the insulation panel (sample) (11).

2) Measurement Method

The amount of nitrogen is controlled by using a nitrogen purge valve (V4) (25) and the degree of vacuum of the vacuum insulation space of the insulation panel(11) is changed by using a valve (V1) and a (V3) on vacuum line(23), such that a certain level of the degree of vacuum is maintained. For the degree of vacuum of $5\times10^{-3}$ torr or greater, vacuum discharge is performed by using a rotary pump (20) and V3 and V4 are controlled while V1 and a turbo pump back line valve (V2) are closed, such that the targeted degree of vacuum is maintained. The degree of vacuum is then measured by using thermocouple gauge (TG). For the degree of vacuum of $5\times10^{-3}$ torr to $5\times10^{-5}$ torr, vacuum discharge is performed by using a turbo pump (21) and V1 and V4 are controlled while V3 is closed, such that the targeted degree of vacuum is maintained. The degree of vacuum is then measured by using cold cathode ion gauge (CIG).

3) Preparation of Insulation Panel Filled with Glass Wools (Sample 1)

A filler was filled between an upper plate and a lower plate. A discharge tube was placed a side of the panel. The upper and lower plates are hemetically bonded by using epoxy. The specification of the panel is as follows:
  Panel material: stainless steel panel, 0.3 t
  Panel shape: Flat
  Dimension: 300 mm×300 mm×10 mm
  Filler material: glass wool
  Filler shape: non-compressive panel
  Getter: none
  Discharge tube: copper tube disposed at a side of a sample panel 4) Preparation of Insulation Panel According to the Present Invention (Sample 2)

A spacer was disposed on a lower plate. A upper plate and a discharge tube were placed and they were hemetically bonded with the lower plate by using epoxy. The specification of the panel is as follows:
  Panel material: stainless steel panel, 0.3 t
  Panel shape: Flat upper and lower plate described in FIGS. 2 and 3
  Dimension: 300 mm×300 mm×10 mm (vacuum space)
  Spacer: stainless steel panel, 0.3 t; arranged as described in FIG. 3
  Getter:None
  Discharge tube: copper tube disposed at a side of a sample panel 5) Preparation of Insulation Panel with Thick Outer Plates (Sample 3)

Figure 25:
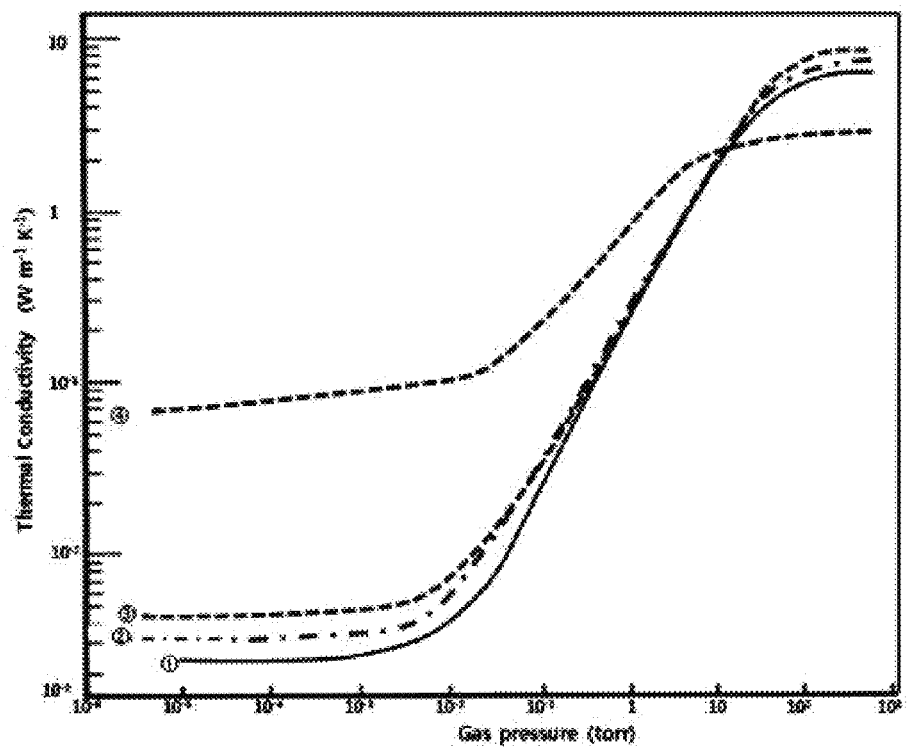
FIG. 25 is a graph showing thermal conductivity of conventional insulation vacuum panel and vacuum insulation panels according to the present invention, in which ① represents theoretical thermal conductivity for vacuumed state (The infrared Hanbook, W. L. Wolfe and G. J. Zeiss Eds., Infrared Information Analysis Center, Environmental Research Institute of Michigan, Mich., p. 15-71 (1993), units converted, ② represents measured value for a dual vacuum insulation panel that does not include a spacer and a filler, ③ represents measured value for a dual vacuum insulation panel including stainless steel outer panels, an inner panel, and a spacer made of a thin, stainless steel plate disposed between the outer panels and inner panel (according to the present invention), and ④ represents measured value for a vacuum insulation panel in which glass wool is filled as a filler.

A few of thin plate spacers were placed between an upper plate and a lower plate and they were hemetically bonded by using epoxy. The specification of the panel is as follows:
  Panel material: stainless steel panel, 3.0 t
  Panel shape: Flat
  Dimension: 300 mm×300 mm×10 mm (vacuum space)
  Spacer: thin plate (the number should be as small as possible only to be able to support the plates from atmospheric pressure and not to perform/block thermal transfer)
  Getter: none
  Discharge tube: copper tube disposed at a side of a sample panel 6) Comparison of Thermal Conductivity The thermal conductivity of the samples 1 to 3 with respect to gas pressure was measured and the measurement result is shown in FIG. 25 (sample 1: ④; sample 2: ③; and sample 3: ②). The reference ① of FIG. 25 shows a theoretical conductivity with regard to a vacuum space. The result shows that the insulation effect of a vacuum space is due to convection blocked by the vacuum space and that the pressure of the vacuum space should be $10^{-2}$ torr or lower to optimize insulation characteristics.

In addition, the result shows that a difference in the thermal conductivities with respect to the same gas pressure. Especially, the thermal conductivity of the insulation panel filled with glass wools ((④)) is significantly higher than those of the other two insulation panels ((②), (③)). It is contemplated to be due to thermal transfer by conduction by the filler. Accordingly, it is preferable to use an insulation panel without fillers and it is important to provide a method or device to be able to maintain $10^{-2}$ torr or lower.

2. Preparation of Insulation Panel According to the Present Invention

The present invention provides vacuum insulation panels with improved insulation characteristics over the prior art insulation panels. The vacuum insulation panels according the present invention include a spacer(s) within a vacuum space(s) so as to allow the outer structure of the panel can be supported and minimize conductive thermal transfer. Non-diffusion getters are disposed on the inner surface of the panels, which help maintain $10^{-2}$ torr or lower. The present insulation panels provide an activation process to maintain the adsorption activity of the getters.

As a vacuum insulation panel according to the present invention, a vacuum insulation panel in which a spacer (300) is disposed between the outer upper plate (100) and the outer lower plate (200) as described in FIGS. 2 and 3 was prepared.

1) Materials and Appearance
Panel material: stainless steel panel, 0.3 t
Panel shape: Flat
Dimension: 300 mm×300 mm×10 mm
Spacer material: stainless steel panel, 0.3 t
Spacer shape: long spacer as described in FIG. 3
Getter: Ti-based non-diffusion getters disposed on the inner surface of outer upper plate
Discharge tube: copper tube disposed at a side of a sample panel 2) Preparation Process The vacuum insulation panel is prepared by a process comprising the steps of: processing an outer panel; processing a spacer; arranging the spacer on an outer lower plate; disposing getters on an outer upper plate to form a getter portion; and assembling and/or post-processing the components.

In the step of processing an outer panel, a metal plate (e.g., stainless steel plate) was cut to provide an outer upper plate (100) and an outer lower plate (200). The upper and lower plates were cleaned and dried. The cleaning process reduced remaining gas after vacuum discharge. Thereafter, the outer upper and lower plates were heat-treated. The heat-treated outer upper plate was pressed to form a space portion (102). The outer upper plate (100) was then cleaned and dried again.

In the step of processing a spacer, a metal plate (e.g., stainless steel) was cut, cleaned, dried, heat-treated, and pressed to form a spacer (300). The spacer was cleaned and dried again.

In the step of arranging the spacer on an outer lower plate, the outer lower plate (200) and the spacer (300) was mounted on a jig, mounted with filler metal:BAg8, introduced into electric furnace to blazing bond the spacer (300) to the outer lower plate (200).

In the step of disposing getters on an outer upper plate, getters were sprayed on the outer upper plate. The upper plate was introduced into an electric furnace in a gas and was plasticized by heating in a reduction gas environment.

Next, the formed upper and lower plates and a discharge tube were mounted on a jig. At the edge, filler metal;BAg8 was mounted. They were heated to perform blazing bonding in reduction gas environment. Vacuum discharge was conducted through the discharge tube. Thereafter, hemecticity was tested. Then, the discharge tube was inserted and vacuum state of the insulation panel was maintained. The discharge tube was cute. Getter activation process was performed to produce a final vacuum insulation panel.

3) Measurement of Thermal Conductivity

After the getter activation process, thermal conductivity of the vacuum insulation panel was measured, the result of which is shown below.

| Time period | Thermal conductivity |
| --- | --- |
| Immediately after preparation | 0.0025 W/mK |
| After 1 week | 0.0035 W/mK |
| After 2 week | 0.003 W/mK |
| After 3 week | 0.0025 W/mK |
| After 4 week | 0.0025 W/mK |
| After 5 week | 0.0035 W/mK |

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

The invention claimed is:

1. A vacuum insulation panel comprising:
   an outer upper plate combined with a wrinkled plate and a flat plate in turn with a space defined therein;
   an outer lower plate bonded and combined with the wrinkled plate and the flat plate in turn with the outer upper plate at the edges thereof;
   a vacuum space defined between the outer upper plate and the outer lower plate;
   a spacer provided within the vacuum space for preventing the outer upper plate and the outer lower plate from being deformed by external pressure; and
   a getter portion disposed over an entire inner surface of the outer upper plate,
   wherein the spacer has a circular cross section and is disposed longitudinally and formed by a plurality of spacers to cause one side of each of the plurality of spacers to be in contact with the flat side of the inner surface of the outer upper plate and the other side of each of the plurality of spacers is attached to the flat side of the inner surface of the outer lower plate.

2. The vacuum insulation panel according to claim 1, wherein the getter portion is formed on a side of a sheet and the other side of the sheet is attached to the inner surface of the outer upper plate.

3. A vacuum insulation panel comprising:
- an outer upper plate combined with a wrinkled plate and a flat plate in turn with a space defined therein;
- an inner flat plate a side of which is bonded with the outer upper plate at the edges thereof;
- an upper vacuum space defined between the outer upper plate and the inner plate;
- an upper spacer provided within the upper vacuum space for preventing the outer upper plate from being deformed by external force;
- an upper getter portion disposed over an entire inner surface of the outer upper plate;
- an outer lower plate combined with the wrinkled plate and the flat plate in turn with a space defined therein, the outer lower plate being bonded to the other side of the inner flat plate at the edges thereof;
- a lower vacuum space defined between the outer lower plate and the inner flat plate;
- a lower spacer provided within the lower vacuum space for preventing the outer lower plate from being deformed by external force; and
- a lower getter portion disposed over an entire inner surface of the outer lower plate,
- wherein the upper spacer has a circular cross section and is disposed longitudinally and formed by a plurality of spacers to cause one side of each of the plurality of spacers to be in contact with the flat side of the inner surface of the outer upper plate and the other side of each of the plurality of spacers is attached to the upper surface of the inner flat plate, and
- wherein the lower spacer has a circular cross section and is disposed longitudinally and formed by a plurality of spacers to cause one side of each of the plurality of spacers to be in contact with the flat side of the inner surface of the outer lower plate and the other side of each of the plurality of spacers is attached to the lower surface of the inner flat plate.

4. The vacuum insulation panel according to claim 3, wherein the upper and lower getter portions are formed by disposing getters on one side of a sheet and attaching the other side of the sheet to the inner surfaces of the outer upper and lower plates.

* * * * *